US012429897B2

(12) United States Patent
Rogert

(10) Patent No.: US 12,429,897 B2
(45) Date of Patent: Sep. 30, 2025

(54) MOTOR VEHICLE PEDAL WITH A DETECTOR FOR DETECTING A PEDAL ARM BREAKAGE

(71) Applicant: HELLA GmbH & Co. KGaA, Lippstadt (DE)

(72) Inventor: Stefan Rogert, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/744,527

(22) Filed: Jun. 14, 2024

(65) Prior Publication Data

US 2024/0338046 A1 Oct. 10, 2024

Related U.S. Application Data

(63) Continuation of application No. PCT/EP2022/084424, filed on Dec. 5, 2022.

(30) Foreign Application Priority Data

Dec. 17, 2021 (DE) ..................... 10 2021 133 594.9

(51) Int. Cl.
*G05G 1/30* (2008.04)
*G05G 1/38* (2008.04)
*G05G 1/44* (2008.04)
*G05G 1/50* (2008.04)

(52) U.S. Cl.
CPC ................. *G05G 1/44* (2013.01); *G05G 1/38* (2013.01); *G05G 1/50* (2013.01)

(58) Field of Classification Search
CPC .. G05G 1/30; G05G 1/38; G05G 1/44; G05G 1/50
See application file for complete search history.

(56) References Cited

U.S. PATENT DOCUMENTS

| | | | | |
|---|---|---|---|---|
| 6,236,199 | B1 | 5/2001 | Irle et al. | |
| 10,417,890 | B2 | 9/2019 | Schomacker | |
| 2005/0072263 | A1* | 4/2005 | Gibson | G05G 1/506 74/560 |
| 2005/0223836 | A1* | 10/2005 | Gibson | G01L 5/225 74/478 |

FOREIGN PATENT DOCUMENTS

| | | | |
|---|---|---|---|
| DE | 19900104 | A1 | 7/1999 |
| DE | 10046634 | A1 | 3/2002 |

(Continued)

OTHER PUBLICATIONS

International Search Report dated Apr. 21, 2023 in corresponding application PCT/EP2022/084424.

*Primary Examiner* — Adam D Rogers
(74) *Attorney, Agent, or Firm* — Muncy, Geissler, Olds & Lowe, P.C.

(57) ABSTRACT

A motor vehicle pedal comprising a footplate and a pedal arm to which the footplate is attached. A holder is provided on which the pedal arm is pivotably mounted. The motor vehicle pedal has a detector to detect a pedal arm break. The detector has a first electrical conductor loop that is guided from at least one region of the pedal arm adjacent to the holder to a region of the pedal arm adjacent to the pedal plate and from there back to the region of the pedal arm adjacent to the holder.

9 Claims, 1 Drawing Sheet

(56) References Cited

FOREIGN PATENT DOCUMENTS

| | | | | | |
|---|---|---|---|---|---|
| DE | 10058362 | A1 | * | 5/2002 | ............. B60R 21/09 |
| DE | 102014212709 | A1 | * | 1/2015 | ............... G05G 1/38 |
| DE | 102008003296 | B4 | | 4/2016 | |
| DE | 102014220470 | A1 | | 4/2016 | |
| DE | 102015015612 | A1 | * | 6/2017 | ................ B60T 7/06 |
| DE | 102022132058 | A1 | * | 6/2024 | |
| EP | 0909955 | B1 | | 9/2009 | |
| EP | 3249634 | A1 | | 11/2017 | |
| EP | 3204251 | B1 | | 6/2018 | |
| FR | 3075408 | A1 | * | 6/2019 | ............. G05G 1/506 |
| KR | 20210105708 | A | * | 8/2021 | |
| WO | WO 2009087013 | A1 | | 7/2009 | |
| WO | WO-2016055202 | A1 | * | 4/2016 | ........... B60K 26/021 |

* cited by examiner

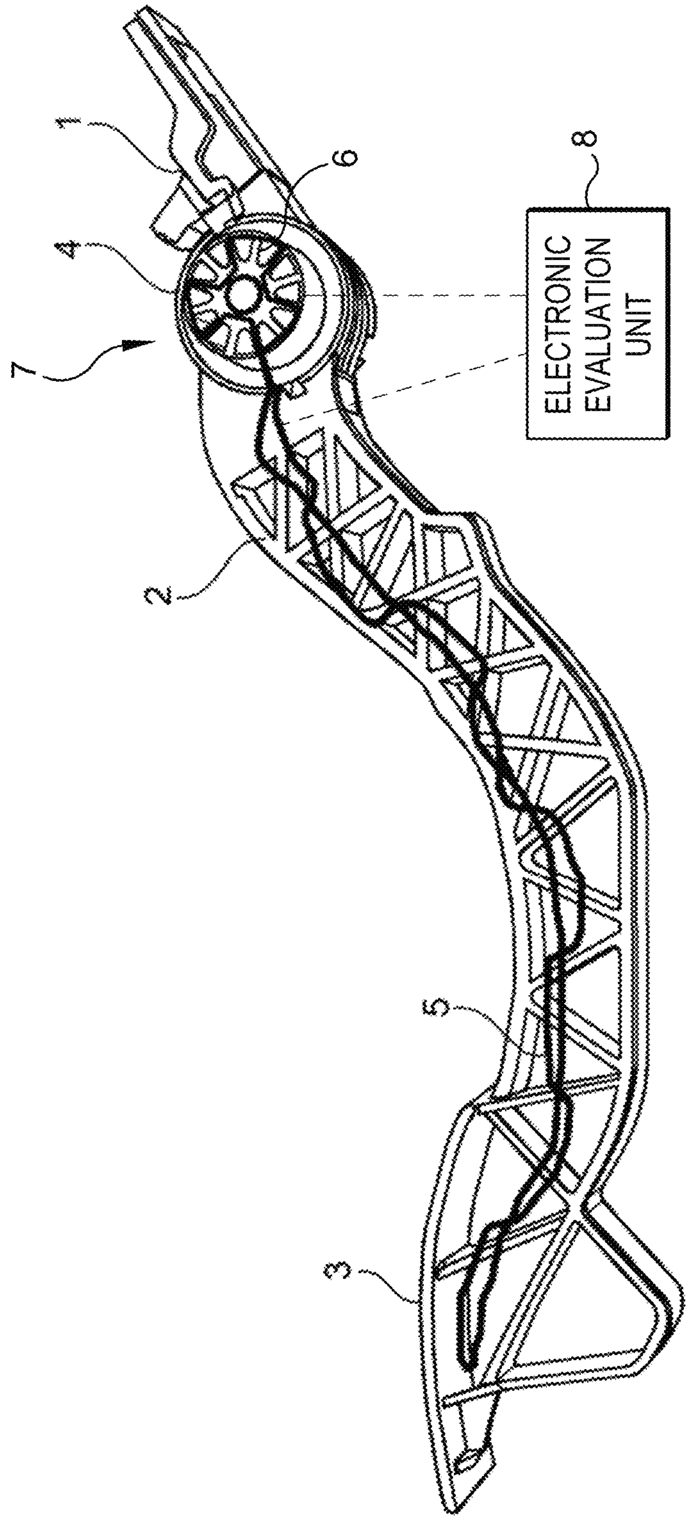
1
6
8
4
ELECTRONIC
EVALUATION
UNIT
7
2
5
3

MOTOR VEHICLE PEDAL WITH A DETECTOR FOR DETECTING A PEDAL ARM BREAKAGE

This nonprovisional application is a continuation of International Application No. PCT/EP2022/084424, which was filed on Dec. 5, 2022, and which claims priority to German Patent Application No. 10 2021 133 594.9, which was filed in Germany on Dec. 17, 2021, and which are both herein incorporated by reference.

BACKGROUND OF THE INVENTION

Field of the Invention

The invention relates to a motor vehicle pedal including a footplate, including a pedal arm, on which the footplate is fastened, including a holder, on which the pedal arm is pivotably supported.

Description of the Background Art

An accelerator pedal is known from the document DE 10 2008 003 296 B4, which corresponds to WO2009/087013, which is incorporated herein by reference, and which includes a pedal arm manufactured from plastic.

In the case of accelerator pedals, the pedal arm, on which the footplate is arranged, which is also known as a pedal plate, is typically made from plastic. In contrast to accelerator pedals, the driver applies very strong forces to brake pedals, in particular, in the case of full braking in emergency situations. In the case of plastic pedal arms of brake pedals, there is then the danger of the pedal arms entirely or partially breaking. A complete breakage represents the lesser danger potential, since such a complete breakage of the brake pedal is very likely to be quickly detected. However, a partial breakage is more dangerous, which is undetectable and does not impair the functional capability of the brake during light braking maneuvers. However, if a strong braking occurs, the brake may not work due to a failure of the brake pedal. For safety reasons, pedal arms made from metal, in particular steel, are therefore provided for brake pedals, since the danger of breakage may be nearly completely ruled out compared to that of a pedal arm made from plastic.

However, the relevant safety regulations would also permit a pedal arm made from plastic if a breakage of the pedal arm is detectable.

This is where the invention comes in.

SUMMARY OF THE INVENTION

It is therefore an object of the invention to provide a motor vehicle pedal, in which a breakage of the pedal arm, even an incomplete breakage, is detectable.

This object is achieved, according to an example of the invention, in that the motor vehicle pedal includes a detector for detecting a pedal arm breakage, the detector including a first electrical conductor loop, which is guided at least from a region adjacent to the holder to a region adjacent to the pedal plate, and from there back to the region adjacent to the holder. It may be provided to provide the conductor used for the first conductor loop over the entire length. A breakage of the pedal arm also results in a breakage of the conductor, which is electrically detectable.

The pedal arm may be made entirely or partially from plastic. However, the detector for detecting a pedal arm breakage may also generally be provided in a pedal having a pedal arm made entirely or partially from a different material, for example, from metal or a from composite material.

It is possible that the first conductor loop is formed from a wire or a litz wire. The wire or the litz wire forming the first conductor loop may be embedded into the material of the pedal arm in at least one section of the first conductor loop. It is possible, for example, that the pedal arm is an injection molded part and can be overmolded with the material of the pedal arm.

As an alternative to a wire or a litz wire, a coating made from a conductive material may be used as the first conductor loop, which is provided on a surface of the pedal arm. A further alternative could be a printed circuit board, in particular a flexible printed circuit board, which carries a printed conductor, which forms the first conductor loop.

The pedal arm may be made up of multiple parts which are assembled into the pedal arm. The wire or the litz wire or the printed circuit board, a flexible printed circuit board, may then be arranged between two parts of the pedal arm. It is likewise possible that the coating made from a conductive material is arranged on a surface of one of the parts of the pedal arm, which is covered by another part of the pedal arm.

The section of the first conductor loop leading to the region adjacent to the footplate and the section of the first conductor loop leading away from the footplate may be twisted with each other. This is particularly easily possible if the first conductor loop is manufactured from a wire or a litz wire. The twisting makes it possible to avoid generating an electromagnetic field by a current flowing through the first conductor loop and/or receiving an interfering field.

The detector for detecting a pedal arm breakage may include an electronic evaluation unit, to which the first conductor loop is connected or which is inductively coupled with the first conductor loop. The presence or the level of the current which flows or is to flow through the first conductor loop may be measured with the aid of the evaluation unit. If the current is not present or if the current is too low, this may be detected with the aid of the evaluation unit. The evaluation unit may then generate a signal which indicates the breakage of the pedal arm.

The motor vehicle pedal may include an inductive rotation angle sensor for determining the pivot angle of the pedal arm. According to the pivot angle, a braking force may then be generated by a brake if the motor vehicle pedal is a brake pedal. If it is an accelerator pedal, a signal is generated according to the pivot angle and provided to an engine controller. The rotation angle sensor may include a rotor and a stator from a further conductor loop in each case. Either the rotor or the stator is fastened on or in the pedal arm. It is preferably the rotor which is fastened on the pedal arm. An inductive rotation angle sensor of this type, which may also be used in a motor vehicle pedal according to the invention, is disclosed in the document DE 10 2008 003 296 B4 or the document EP 0 909 955 B1, which corresponds to U.S. Pat. No. 6,236,199, and which are all herein incorporated by reference. An electromagnetic field is generated with the aid of the conductor loop of the stator. This electromagnetic field induces, in the moving further conductor loop of the rotor, a current, which also induces an electromagnetic field. The stator may include a transmitting coil as the conductor loop for transmission and two, but preferably three, receiving coils as conductor loops for reception. The electromagnetic fields induced by the conductor loop of the stator and the further conductor loop of the rotor overlap with each other. The resulting electromagnetic field acts upon the conductor loop for reception in the stator, whereby the current flowing through this conductor loop changes in the stator. This change of the current may be detected and make a statement possible about the rotation angle of the rotor or of the pedal arm.

The rotation angle sensor may have an electronic evaluation unit, to which the conductor loop of the stator is connected. The current flowing through the conductor loop of the stator may be evaluated with the aid of the electronic evaluation unit.

The further conductor loop may form a circuit with the first conductor loop on or in the pedal arm, in particular of the rotor.

It is furthermore possible that the evaluation unit of the detector for detecting a pedal arm breakage and the evaluation unit of the rotation angle sensor form a common evaluation unit. They can both analyze signals coupled into the stator from the rotor and thus determine the pedal arm breakages and/or the rotation angle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIG. shows a perspective representation of a motor vehicle pedal according to the invention.

DETAILED DESCRIPTION

The motor vehicle pedal illustrated in the FIG. includes a holder 1, pedal arm 2, and a footplate 3, which is connected to pedal arm 2 as a single piece and is formed thereon. A return spring (not illustrated) may be arranged between holder 1 and pedal arm 2, with the aid of which the pedal arm may be returned to an initial position after an actuation. The return spring may also be used elsewhere in the pedal. Holder 1 and pedal arm 2 are connected to each other via a pivot bearing. A stator and a rotor 4 of an inductive rotation angle sensor 7 are provided in the region of the pivot bearing. The axis defined by the pivot bearing is also the axis around which the rotor 4 is moved during an actuation of the pedal. The stator (not illustrated) is mounted on holder 1, and rotor 4 is mounted on pedal arm 2. The stator may include at least one transmitting coil and at least two, but preferably three, receiving coils. The pedal arm is a plastic injection-molded part. It may also be manufactured from a different material and using a different manufacturing method.

A first conductor loop 5 made from a wire is provided on the pedal arm, which is guided from a region of pedal arm 2 adjacent to holder 1 to a region of pedal arm 2 adjacent to the footplate and back to the region adjacent to holder 1. First conductor loop 5 may also be guided in a different manner. However, it must be arranged in the region in which a breakage is to be detected. The outgoing wire and return wire formed thereby are twisted with each other. However, pedals according to the invention may also exist, in which the outgoing wire and return wire are not twisted with each other.

Rotor 4 of the sensor 7 is formed by at least one further conductor loop 6. This further conductor loop 6 may be formed by a sheet metal part, as disclosed for a rotor of an inductive rotation angle sensor, for example, in the document DE 10 2008 003 296 B4 or EP 0 909 955 B1. In contrast to the closed conductor loops formed by the rotors disclosed there, further conductor loop 6 of the rotation angle sensor 7 of the present motor vehicle pedal, which is formed by rotor 4, is open at one point, and ends of first conductor loop 5 are connected to the ends of further conductor loop 6 formed thereby, so that first conductor loop 5 and further conductor loop 6 form a closed circuit. A current induced in further conductor loop 6 thus also flows through first conductor loop 5.

The stator of the inductive rotation angle sensor 7 is also formed by a conductor loop. It is connected to an electrical source, which drives an electrical current through the conductor loop. This current flowing through the conductor loop forming the stator generates an electromagnetic field, in which rotor 4 moves. The movement of rotor 4 in the electromagnetic field generated by the current in the stator acts upon the electromagnetic field between rotor 4 and the stator and thereby influences the current in the conductor loop forming the stator. The current flowing through the stator is measured and evaluated in an evaluation unit 8. A piece of information about the rotation angle between the stator and rotor 4, and thus between the holder and the pedal arm, may be obtained thereby. The evaluation unit 8 generates a signal which indicates the rotation angle and makes this signal available at an output of the evaluation unit 8.

The current flowing in first conductor loop 5 and further conductor loop 6 forming rotor 4 is interrupted when first conductor loop 5, the further conductor loop 6 forming the rotor 4, or the connection of the two conductor loops is disconnected.

This is the case when pedal arm 2 breaks. The breakage of pedal arm 2 interrupts first conductor loop 5. The interruption of the current results in a changed behavior of the rotor on the current in the receiving coils of the stator, which may be detected by the evaluation unit 8. A signal is then generated in the evaluation unit 8, which indicates the breakage of the first conductor loop, which may be evaluated as a breakage of pedal arm 2. This signal is made available at the output of the evaluation unit 8.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor vehicle pedal comprising:

a footplate;

a pedal arm to which the footplate is fastened;

a holder on which the pedal arm is pivotably supported; and a detector to detect a pedal arm breakage, the detector having a first electrical conductor loop that is guided at least from a region of the pedal arm adjacent to the holder to a region of the pedal arm adjacent to the footplate, and from there back to the region of the pedal arm adjacent to the holder.

2. The motor vehicle pedal according to claim 1, wherein the pedal arm is made entirely or partially from plastic.

3. The motor vehicle pedal according to claim 1, wherein the first conductor loop is formed from a wire or a litz wire.

4. The motor vehicle pedal according to claim 3, wherein the wire or litz wire is embedded into a material of the pedal arm in at least one section of the first conductor loop or is overmolded by the material of the pedal arm.

5. The motor vehicle pedal according to claim 1, wherein the detector to detect the pedal arm breakage includes an electronic evaluation unit, to which the first conductor loop is connected or which is inductively coupled with the first conductor loop.

6. The motor vehicle pedal according to claim 1, wherein the motor vehicle pedal includes an inductive rotation angle sensor for determining a pivot angle of the pedal arm, the rotation angle sensor including a rotor made from a further conductor loop, and wherein the rotor is fastened on or in the pedal arm.

7. The motor vehicle pedal according to claim 6, wherein the rotation angle sensor is connected to an electronic evaluation unit.

8. The motor vehicle pedal according to claim 7, wherein the detector to detect the pedal arm breakage includes an electronic evaluation unit, and wherein the evaluation unit of the detector and the evaluation unit of the rotation angle sensor form a common evaluation unit.

9. The motor vehicle pedal according to claim 6, wherein the further conductor loop forms a circuit with the first conductor loop on or in the pedal arm.

* * * * *